March 31, 1970     H. BERGER     3,503,716
APPARATUS FOR THE CATALYTIC REMOVAL OF NOXIOUS SUBSTANCES
FROM ENGINE EXHAUST GASES
Filed Oct. 31, 1966     2 Sheets-Sheet 1
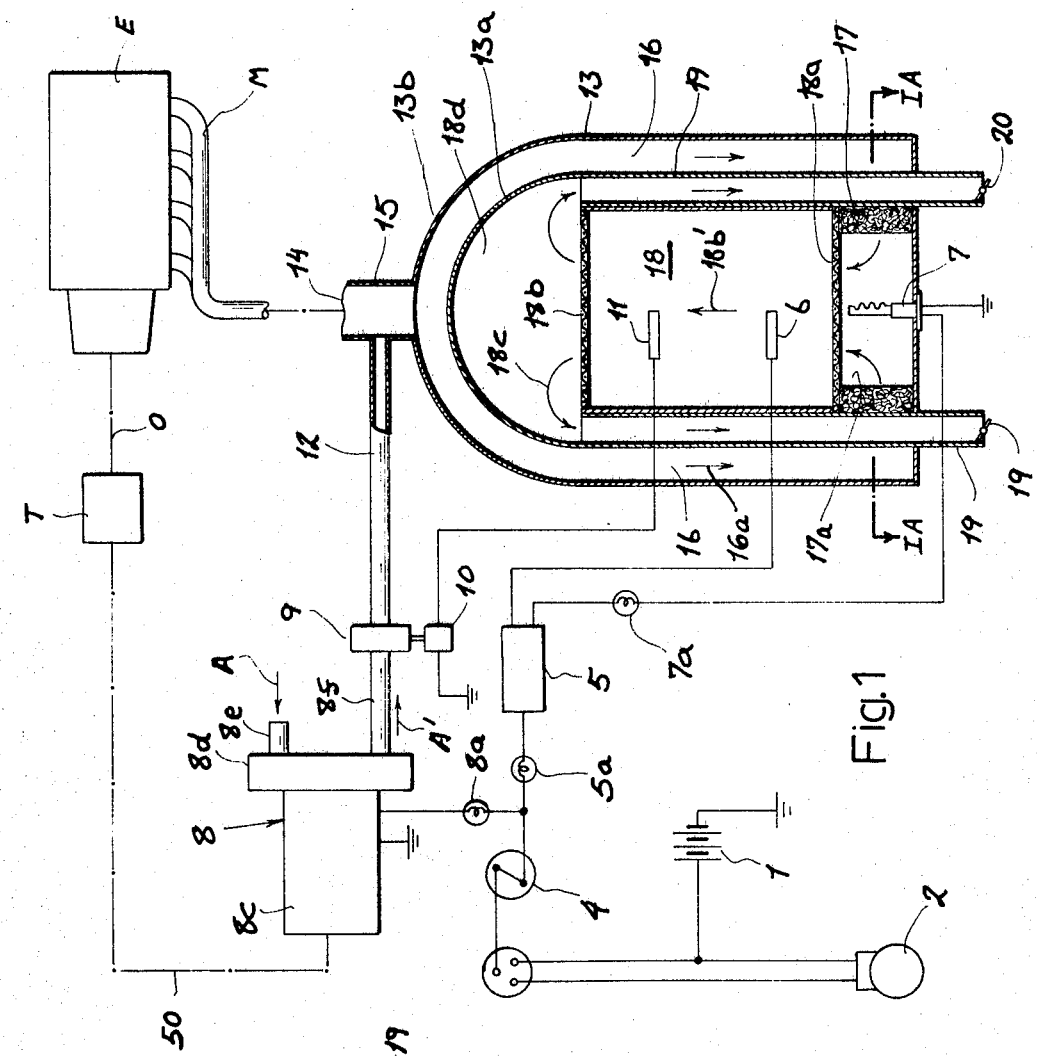
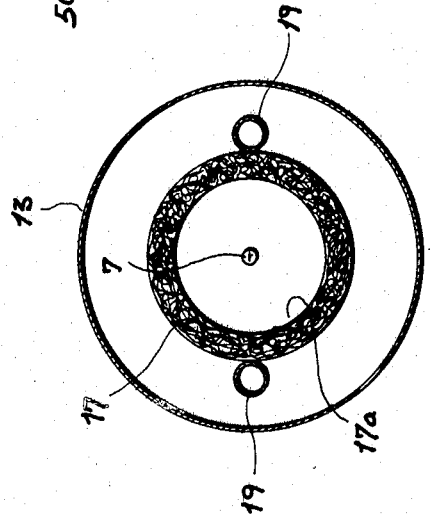
Heinz Berger
INVENTOR.
BY Karl J. Ross
Attorney

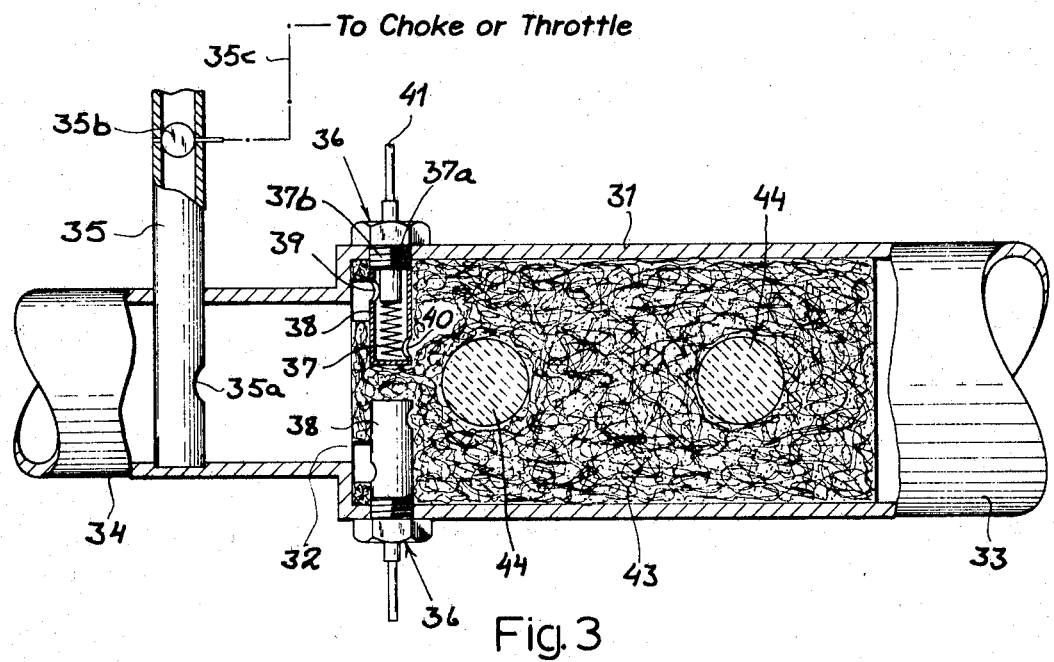
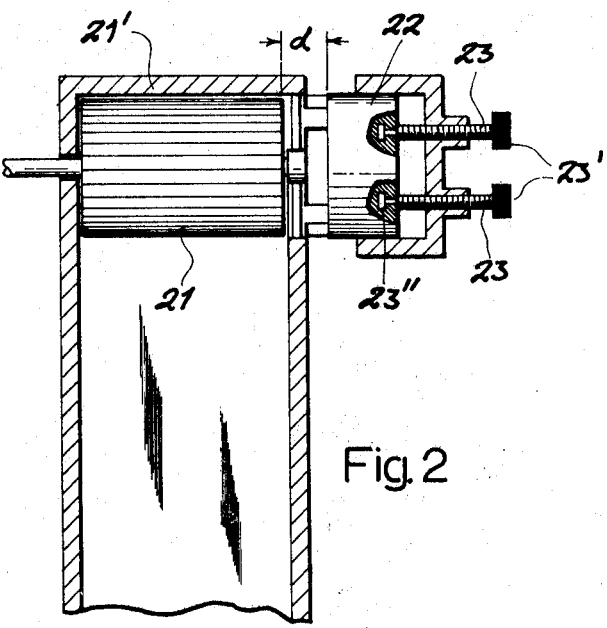

3,503,716
APPARATUS FOR THE CATALYTIC REMOVAL OF NOXIOUS SUBSTANCES FROM ENGINE EXHAUST GASES
Heinz Berger, Triftweg 2, Hoxter, Westphalia, Germany
Filed Oct. 31, 1966, Ser. No. 590,931
Claims priority, application Germany, Oct. 29, 1965, B 84,292
Int. Cl. B01j 9/04; F02c 7/26
U.S. Cl. 23—288                                          1 Claim

ABSTRACT OF THE DISCLOSURE

This disclosure relates to an apparatus for the catalytic oxidation of automotive exhaust gas in which the gas is passed initially through a pre-igniting compartment containing a heating element and thence into contact with a catalyst mass together with secondary air for oxidizing combustible components of the exhaust gas.

The catalyst chamber is surrounded by a preheating compartment through which the gas is led initially so that the incoming exhaust gas and secondary air is brought to a higher temperature for the catalyst reaction. Temperature-control means regulates the supply of secondary air and/or the operation of the pre-igniting means to maintain the temperature in the catalyst zone within a predetermined range.

---

My present invention relates to apparatus for the removal of noxious substances from exhaust gases of internal combustion engines and, more particularly, to a system for the catalytic reformation of automotive and other engine exhaust gases into substances which are not disadvantageous from a health or environmental point of view.

With the rise of interest in devices for the catalytic reformation of the exhaust gases of internal combustion engines, which contribute large quantities of air pollutants and unhealthful contaminants to the environment, there have been proposed a variety of devices for the catalytic oxidation of oxidizable substances in such exhaust gases which may be mounted directly upon the motor vehicle. In such systems, a reaction chamber communicates with the exhaust manifold of the engine and contains a catalyst substance whose active surfaces promote oxidation of combustible components of the exhaust gas. In this manner, residual hydrocarbons are converted to water vapor and carbon dioxide, carbon monoxide is transformed into carbon dioxide and any hydrogen remaining from the internal-combustion reaction is transformed into water vapor. These systems have, however, some important disadvantages in that they are incapable of sustaining a wide range of gas-input rates and thus of compensating for changes in the speed of the engine. Moreover, almost invariably the catalyst chambers and duct systems have required large volumes in the region of the engine and thus have created redesign problems, have involved high equipment costs and have made replacement or repair difficult.

It is, therefore, the principal object of the present invention to provide an improved apparatus for the elimination of nonious contaminants from the exhaust gases of internal combustion engines.

A further object of this invention is to provide a catalytic reformation system for the exhaust gases of automotive internal combustion engines which can be accommodated with ease in the region of the engine or elsewhere in the automotive vehicle, which is of relatively low cost and which has a high gas-treatment efficiency.

Yet another object of my invention is to provide a catalyst apparatus for the purification of the exhaust gases of an automotive engine which compensates for varying load conditions and engine speeds and which requires a minimum space while affording high purification effectiveness.

These objects and others which will become apparent hereinafter, are attained, in accordance with the present invention, in a system for the catalytic invention of exhaust gases from an automotive vehicle or like internal-combustion engine wherein the housing of the apparatus forms a central catalyst-containing chamber surrounded by a gas-flow compartment (preferably extending all around the periphery of the catalyst chamber) into which the exhaust gas is led so that a heat exchange between the catalyst mass and the exhaust gas and/or secondary air introduced into the surrounding compartment is assured. Thus, during early stages of the catalyst operation (i.e. prior to its attaining a steady state or auto-oxidation reaction) hot gases from the engine may raise the temperature of the catalyst mass. More commonly, however, the temperature of the catalyst mass will, as a reuslt of the operation heating or ignition means described in greater detail below, the catalyst body will be brought to an elevated temperature relatively rapidly and will preheat, via this heat exchange, both the secondary air and the exhaust gas fed through the outer chamber.

I have found it advantageous, according to a more specific feature of this invention, to introduce both the secondary air and the exhaust gas (which contains the usual proportion of oxidizable and oxidized components) into the outer chamber together at a location remote from the region of communication between this outer or preheating chamber and the catalyst compartment, while providing in the region of this communication a filter means between the preheating compartment and the catalyst chamber which at least partly constricts the throughflow of the gas mixture to insure a relatively long dwell time for the latter in the system and to subdivide the gas mixture into individual and minute turbulently mixed streams; the latter are subjected to an ignition or heating treatment prior to entry into the catalyst chamber. It has been found that the preignition of the exhaust gas/air mixture prior to its entry into the catalyst chamber results in a regeneration and activation of the catalyst as well as a means for initiating the chemical reformation of the combustion products.

According to a further feature of this invention, the ignition device comprises a heater element (e.g. of helical or spiral configuration) coiled between a pair of catalytically effective ceramic plates or lodged within a catalytically effective ceramic tube whereby the ignition is promoted by catalytic action in the region of the heater elements. The ignition device is removably received in the housing and disposed at an accessible region thereof for rapid replacement. The exhaust gas/air mixture can, moreover be subdivided according to this invention into a plurality of gas streams individually subjected to respective ignition operations with the flamed-out gas being then passed collectively through the catalyst chamber. In this manner, the temperature produced by the afterburner-type ignition is kept somewhat lower than that which would be expected from a collective ignition of the gas mixture. There is thus less tendency toward thermal distortion of the housing and support structure.

Most desirably, the catalyst material is constituted as a ceramic catalyst body impregnated or permeated with the catalyst substance and formed with capillary channels by the embedding of a fabric in the plastic ceramic mass and the subsequent thermal destruction of this fabric to leave a lattice work of such channels. Catalyst bodies of this type and methods of making them are fully described and claimed in my copending application Ser. No. 590,930, filed concurrently herewith and entitled "Catalyst for Engine Exhaust-Gas Reformation."

The ignition device of the present invention can be constituted in accordance with another aspect thereof, of an electrical radiant heating coil and a catalytically effective hollow body surrounded with all-around clearance by a sleeve which has openings above and below the heating coil for the introduction and removal of the partial gas streams. The heating device is preferably used in combination with a filter arrangement or other sieve arrangement, e.g. a wire, wire filter, filter disk or the like which are treated with or otherwise contain catalyst substances, the heating element extending substantially to the filter networks whereby the gases subjected to the ignition operation contact the catalytically effective filter body without delay. The filter body can be charged with catalyst-metal oxides (e.g. cobalt, manganese, copper, platinum or palladium oxides) alone or in combination. It has been observed that the filter body is most effective when the gas passages therethrough are of a random orientation so that the body itself may be constituted from a jumbled and disordered accumulation of material whereby a greater dwell time for contact between the gases and the catalyst materials is insured. This configuration of the catalyst body also guarantees a greater contact area and, therefore, an improved oxidation efficiency with surprisingly little tendency toward contamination by lead-containing components or soot which normally are formed in the exhaust gases of internal-combustion engines. The filter body may, moreover, be composed of a mass of wire non-coherent random balls, disks, packing elements or the like which are in direct contact with one another so that excellent heat-transfer efficiency between the elements and the housing is provided.

I have also found it to be advantageous to provide at least one and preferably two or more temperature sensors in the catalyst mass for controlling the ignition arrangement and/or the blower means to maintain the temperature of the catalyst chamber at a predetermined level. As I have already pointed out, the oxidation reaction is generally exothermic and is self-sustaining when, for example, a temperature of 700–800° C. is registered. At this point it is desirable to cut off further operation of the ignition means and thereby limit artificially induced temperature increase in the catalyst and prevent its early deterioration. Upon reduction of the temperature, the ignition device may again be turned on. I have found it to be desirable to limit the introduction of secondary air from the blower when the temperature of the catalyst tends to be excessive. This control of the blower output can be had via a throttle flap or damper, by regulating the speed of the blower rotor, by mechanically, magnetically or pneumatically changing the clearance between the blower rotor and the housing or otherwise modifying the effective capacity of the blower means. Moreover, a single ignition device may serve to prepare the gas mixture for introduction into a plurality of parallel catalyst chambers. It is possible in such cases to restrict the space required for the re-formation system to a relatively narrow area.

The above and other objects, features and advantages of the present invention will become more readily apparent from the following description, reference being made to the accompanying drawing in which:

FIG. 1 is an axial cross-sectional view through a catalytic exhaust gas purified in accordance with this invention, with the control means therefor illustrated diagrammatically;

FIG. 1A is a cross-sectional view taken along the line IA—IA of FIG. 1;

FIG. 2 is an elevational view of a blower for use in a system similar to that of FIG. 1 but provided with other means for controlling the volume of air supplied to the catalyst chamber; and FIG. 3 is a cross-sectional view of a system in which the exhaust-gas stream is divided into respective streams.

In FIGS. 1 and 1A, I show a catalytic chamber 18 which is filled with catalyst bodies of the type described and claimed in my copending application identified earlier, and received between a pair of filter plates 18a and 18b in the interior of a housing formed by a wall 13a. The filter plate 18a is coated with or filled with a catalytically active material and may thus have a surface covering of copper oxide, manganese oxide, cobalt oxide, platinum or palladium applied in any conventional manner. The wall 13a forms a heat-exchange member across which a heat exchange is carried out between the catalyst mass and a mixture of exhaust gas and air passing axially (arrow 16a) around the catalyst chamber 18 within an outer sleeve or shell 13. The latter is formed with a domed portion 13b parallel to the domed portion 13a and serving to streamline the distribution of the gas mixture all around the catalyst chamber 18, the preheating compartment 16 communicating with exhaust manifold M of an internal combustion engine E by any conventional means. The engine E has a crankshaft or other output member O which drives a governor or tachometer T which, as represented by dot-dash line 50, may energize a blower 8 independently of any other means so that the output of this blower is proportional to the speed of the engine E and thus the volume of exhaust gas produced therein.

The blower 8 has an electromotor 8c which drives a rotor within a housing 8d provided with an intake 8e and an outlet 8f. The outlet feeds the air-inlet line 12 of the assembly via a solenoid-operated damper 9 whose solenoid 10 is actuated via a thermostat 11. The latter constitutes one of at least two damper-sensitive elements embedded in the catalyst mass in chamber 18, the other element 6 operating a relay 5 over which a heating element 7 in the preignition chamber 17a of the device can be energized. The preignition chamber 17a communicates with the annular clearance 16 of the outer housing 13 via a filter body 17 composed of wire turnings, a random mass of wire, particles or the like and adapted to subdivide the incoming gas mixture into a multiplicity of homogeneous streams which, upon approach to the heating element 7 are ignited prior to passing into the catalyst chamber 18.

The vehicle is, of course, provided with the usual electrical network including a battery 1 which is rechargeable from a generator 2. The motor-driven generator 2 also is connected in circuit with an ignition switch 4 only one contact of which is shown.

OPERATION

Upon closure of the ignition switch 4, an electric current from the battery is supplied to the blower 8 which induces a flow of air in the direction of arrows A, A' through the duct 12 into the inlet 15 of the catalyst system. The closure of the switch 4 simultaneously energizes the indicator lamp 8a to signal the vehicle operator that the re-formation device is in a state of readiness.

The air stream flows from the inlet 15 through the outer combustion chamber 13 which surrounds the catalyst chamber 18 filled with the porous catalyst body of the type described, illustrated and claimed in my aforementioned copending application. The catalyst compartment 18 has an inlet end 18a provided with imperforated filter plates at its exhaust end remote from the gas inlet 15 so that the air/exhaust gas mixture passes along the clearance 16 all around the catalyst chamber and over its full axial length to be preheated by the heat transfer of energy through the inner wall 13a of the outer chamber.

At the inlet end of the catalyst chamber 18, the annular filter body 17 subdivides the exhaust gas/air mixture into a plurality of partial streams which are ignited by the heating element there, the latter being of the type described in greater detail in connection with FIG. 3. Prior to the starting of the internal-combustion engine E, from which the exhaust gas is supplied at the opening 14 connected with the exhaust manifold M of the engine, the relay 5, energized over the ignition switch 4, supplied electric current to the heating element 7. Thus, even before any exhaust gas enters chamber 13 and clearance 16, air from blower 8 has passed through the system and into a heating compartment 17a surrounded by the filter body 17 and into contact with the heating element 7. This air is readily brought to an elevated temperature and preheats the catalyst body within chamber 18.

A further control lamp 5a is connected in circuit with the relay 5 to show that current supplied to the heating and ignition device is available, while a further lamp 7a in circuit with the heating element indicates to the operator the "on" and "off" conditions of this heating device. The ignition switch 4 also serves to connect the vehicle generator 2 with the heating element and blower 8 so that there is no substantial draining of the battery by this means when the engine is in operation. When a heater of the type set forth in the copending application is employed, it may be connected in parallel with the ignition device 7.

When, however, the engine is turned on, exhaust gases enter the system at 14 and are mixed with the air supply from line 12 and the blower 8. The resulting mixture, upon its passage through the filter 17, is thoroughly and homogeneously mixed; the individual gas flows in compartment 17a contact the heating element 7 which flames the mixture. The latter then passes into contact with the catalyst-permeated screen 18a and the catalyst body within chamber 18 so that re-formation of the exhaust gas is effectively carried out and the air-polluting contaminants are eliminated by conversion into such harmless substances as carbon dioxide and water vapor.

The re-formed gas passes through the catalyst body in the direction of arrow 18b' and emerges from the catalyst chamber at 18c into the domed head 18d through which substantial heat exchange is detected between the re-formed gas and the incoming gas mixture. The gas is led away from the dome 19d by a pair of axially extending ducts 19 best seen in FIGS. 1 and 1a. The preheating and ignition is compartment 17a serves to regenerate and activate the catalyst and to chemically transform some of the constituents of exhaust gas which are most difficult to catalytically oxidize. Thus, heavy hydrocarbons are readily converted, in the compartment 17a, by cracking or precombustion into materials more easily treated with catalysts in chamber 18. The exhaust gas is discharged into the atmosphere via lines 19 and a control damper (not shown) after a dwell time in the catalyst chamber 18 sufficient to ensure substantially total removal of all contaminating matter and is transformation into harmless substances. A heat transfer between the incoming gas mixture and the outgoing re-formed gas is carried out through the walls of tube 19.

Within the catalyst mass 18, there are provided a pair of temperature-responsive elements 6 and 11, the former being connected to the relay 5 for terminating the energization of heater 7 upon the attainment of a predetermined temperature (700–800° C.). When the heater is cut off, lamp 7a extinguishes to indicate this fact to the vehicle operator, the lamp relighting when the heater 7 is again energized. The thermostatic element 11, also embedded in the catalyst body 18, controls an electrically operated damper 9 via a solenoid 10 to regulate the supply of secondary air to the chamber 13 and for mixture with the exhaust gas. In practice, it has been found most desirable (especially when the catalyst is one of those described in my copending application identified earlier) to set the thermostat 6 to cut off the heater 7 when the temperature of the catalyst rises to, say, 700–800° C., while the thermostat 11 is set to decrease the oxygen input via the damper 9 when the temperature rises to 900–1000° C. and thereby reduces the heat output of the exothermic reaction. The damper 9 need not be continuously variable but may be solenoid-operated between tube positions, a full-delivery position and a half-delivery position in which the volume of air is cut down to a fraction of its usual delivery. As a practical matter, the thermostatic devices maintain the temperature of the catalyst between 700–1000° C. It is found that at these temperatures and even at temperatures as low as 500° C., a practically complete elimination of air pollutants from the exhaust gas is assured.

In FIG. 2 I show another system for controlling the volume rate of flow of the air into the combustion chamber. In this embodiment, the blower comprises a rotor or fan 21, shown diagrammatically in this figure, confronting a blocking disk 22 whose distance $d$ from the rotor 21 can be adjusted exteriorally of the housing 21' of the blower. For this purpose, I provide screws 23 whose knurled heads 23' are rotatable by the operator without removal of the housing portions. The shanks of screws 23 are formed with heads 23'' rotatably engaged in the blocking disk 22. It will be understood that the adjustment of the clearance $d$ permits variation of the total air volume displaced per unit time. The clearance $d$ can, of course, be adjusted by any other means conventional for controlling clearance and aperture between two juxtaposed members. Such means can include mechanical (i.e. lever or cam systems), magnetic or pneumatic devices. Electrical systems (e.g. electromagnetic) can be operated via the thermal element 6 or other thermal sensing devices for the purpose. A pneumatic system may respond to pressure within the carburetor or the intake vacuum of the engine.

According to a further feature of this invention, the blower has sufficient output velocity and pressure to maintain the interstices of the catalyst body clear of carbonaceous and other deposits which may pass the filter means. At any rate, the blower must have a capacity in its maximum-output state which will supply substantially all the requirements for secondary air in the catalyst chamber at maximum vehicle load and engine speed. It has been found to be desirable to provide tubes 19 (FIG. 1) of such diameter and cross-section relative to the flow cross-section of the catalyst system as to maintain the average dwell time or or catalyst-contact time of the gas mixture sufficient to ensure substantially complete oxidation of the oxidizable components of the exhaust gas. To this end, dampers 20 may be provided in the tubes 19 for adjusting the flow cross-section as illustrated in FIG. 1.

In the system of FIG. 3, the exhaust gas stream is subdivided as described more generally above. The housing 31 is provided with an inlet 32 for the exhaust gas and a further opening 33 for the discharge of the re-formed gases. A top 34 opens into the inlet 32 and serves to connect this inlet with the manifold M of an internal-combustion engine E (not shown in FIG. 3 but as illustrated diagrammatically in FIG. 1). A further tube 35, extending transversely to duct 34, extends diametrically into the latter and opens axially at 35a into the duct for supplying the secondary air thereto. This method of mixing the exhaust gas and air has been found to be most advantageous during the problematical periods of operation of the engine, namely, idle, low speed and high-rate drive. The air inlet 35 is regulated in this system via a damper 35b which is connected via line 35c to the choke or throttle controls so as to supply air in accordance with the richness of the mixture. When a relatively rich gas-mixture is fed to the engine, a correspondingly larger quantity of air is introduced into the catalyst chamber with the exhaust gases.

In the housing 31, I provide preignition means in the form of a heating device 36 which is radially removable via a screw thread 37b and includes a heating coil 37 mounted upon a catalytically permeated sintered-ceramic hollow body 37a. A multiplicity of such heating bodies are disposed in angularly spaced relationship about the axis of the catalyst chamber and extend radially into the latter. Each of the heating coils 37 and respective catalytically effective pedestals 37a are surrounded by a protective shell 38 having an inlet opening 39 at one end (turned toward the inlet duct 34) and an outlet port 40 at the opposite end of the shell turned in the direction of the outlet 33. A terminal 41 is connected to one end of the heating coil 37 while the other end is attached to the thread portion 37b and is grounded to the veicle via the housing 31.

A portion of the exhaust gas stream is thus conducted through each of the shells 38 upon entry through the respective port 39 over the heating coil 37 and into contact with the catalytic hollow bodies 37a. The resulting combustion heats the bodies to a level sufficient to sustain at least preignition-combustion even after the electric current is terminated. The catalyst chamber is filled with a packing 43 of metal wire (e.g. stainless steel) which is heated by the flame emerging from the openings 40 in the direction of outlet 33. In this wire packing, I embed catalyst bodies 44 of the type described in my above-mentioned copending application across which the exhaust gas/air mixture flows in parallel. The catalyst bodies sustain complete oxidation of the exhaust gas streams. The metal packing 43 is also catalytically active and is permeated with particles of one or more of the catalyst oxides enumerated above. In addition, the wire packing acts as a filter for any particular materials which may remain in the gas stream.

The invention described and illustrated is believed to admit of many modifications within the ability of persons skilled in the art, all such modifications being considered within the spirit and scope of the appended claim.

I claim:
1. An apparatus for the catalytic reformation of exhaust gases of an internal combustion engine, comprising housing means forming a catalyst-containing oxidation chamber, inlet means connected with said housing means for delivering to said chamber exhaust gas from an internal-combustion engine and air for concurrent passage thereof through said chamber; outlet means communicating with said chamber remote from said inlet means for leading catalytically reformed gas therefrom; and preigniting means including a heating element disposed between said inlet means and said chamber for igniting at least part of the exhaust-gas/air mixture enterin said chamber, said preigniting means including a plurality of such heating elements, each of which is traversed by a portion of said mixture and said mixture flows along said heating elements in parallel prior to catalyst reformation, in said chamber, a plurality of catalyst zones being provided between said inlet and said outlet means and said heating element being provided between two such zones, said heating element including a coil of resistance-heating wire removably mounted in said housing means, a tubular catalytically effective body carrying said coil, and a tubular sheath surrounding said coil, said sheath being open at one extremity in the direction of said inlet means for receiving said mixture and open at the other extremity of said sheath toward said outlet means for discharging said mixture, and said chamber containing a packing of metallic wire containing a catalyst substance in the interstices thereof and heated in part by flame emerging from said sheath with said gas mixture.

References Cited

UNITED STATES PATENTS

| | | |
|---|---|---|
| 1,789,812 | 1/1931 | J. C. W. Frazer. |
| 1,971,246 | 8/1934 | J. Anderson. |
| 2,396,190 | 3/1946 | Morgan. |

JAMES H. TAYMAN, Jr., Primary Examiner

U.S. Cl. X.R.

23—2; 60—39.82, 29; 219—374; 230—114, 125